US011388301B2

(12) United States Patent
Toda et al.

(10) Patent No.: US 11,388,301 B2
(45) Date of Patent: Jul. 12, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Shuhei Toda, Kanagawa (JP); Hiroyuki Mitsuhashi, Kanagawa (JP); Yusuke Taguchi, Kanagawa (JP); Yohei Makino, Kanagawa (JP); Akihiro Ishii, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/034,202

(22) Filed: Sep. 28, 2020

(65) Prior Publication Data
US 2021/0250453 A1 Aug. 12, 2021

(30) Foreign Application Priority Data
Feb. 12, 2020 (JP) .............................. JP2020-021861

(51) Int. Cl.
*H04N 1/00* (2006.01)

(52) U.S. Cl.
CPC ..... *H04N 1/00514* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| 10,248,481 | B2 | 4/2019 | Minami et al. |
| 2015/0227327 | A1* | 8/2015 | Akiyama ............... G06F 3/1254 358/1.15 |
| 2017/0371729 | A1* | 12/2017 | Minami .............. G06F 13/4226 |
| 2020/0205748 | A1* | 7/2020 | Pautsch ................ A61B 5/4812 |
| 2020/0344508 | A1* | 10/2020 | Edwards .......... H04N 21/44213 |

FOREIGN PATENT DOCUMENTS

| JP | 2017-229035 A | 12/2017 |
| WO | 2017/094177 A1 | 6/2017 |

* cited by examiner

*Primary Examiner* — Frantz Bataille
(74) *Attorney, Agent, or Firm* — Oliff PLC

(57) ABSTRACT

An information processing apparatus includes a processor. The processor is configured to acquire biological information on a user while an operation related to a process is performed, and output information that suggests setting for the process in a case where the biological information indicates a peaceful psychological state.

20 Claims, 7 Drawing Sheets

FIG. 6
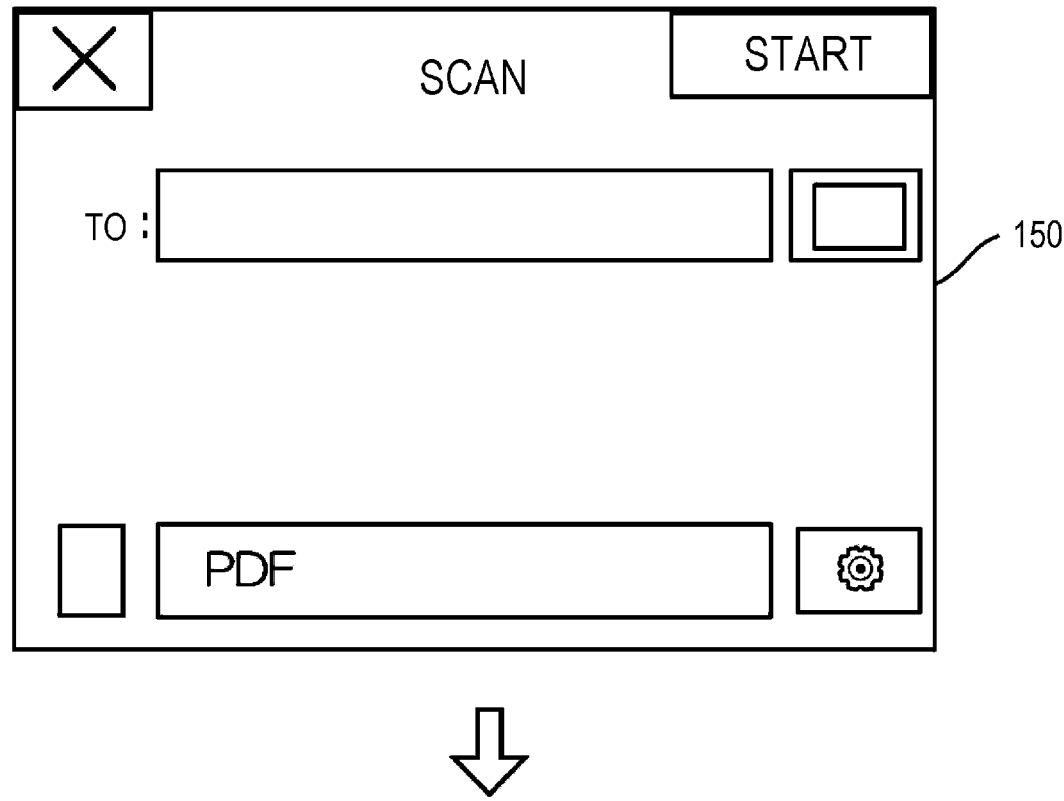
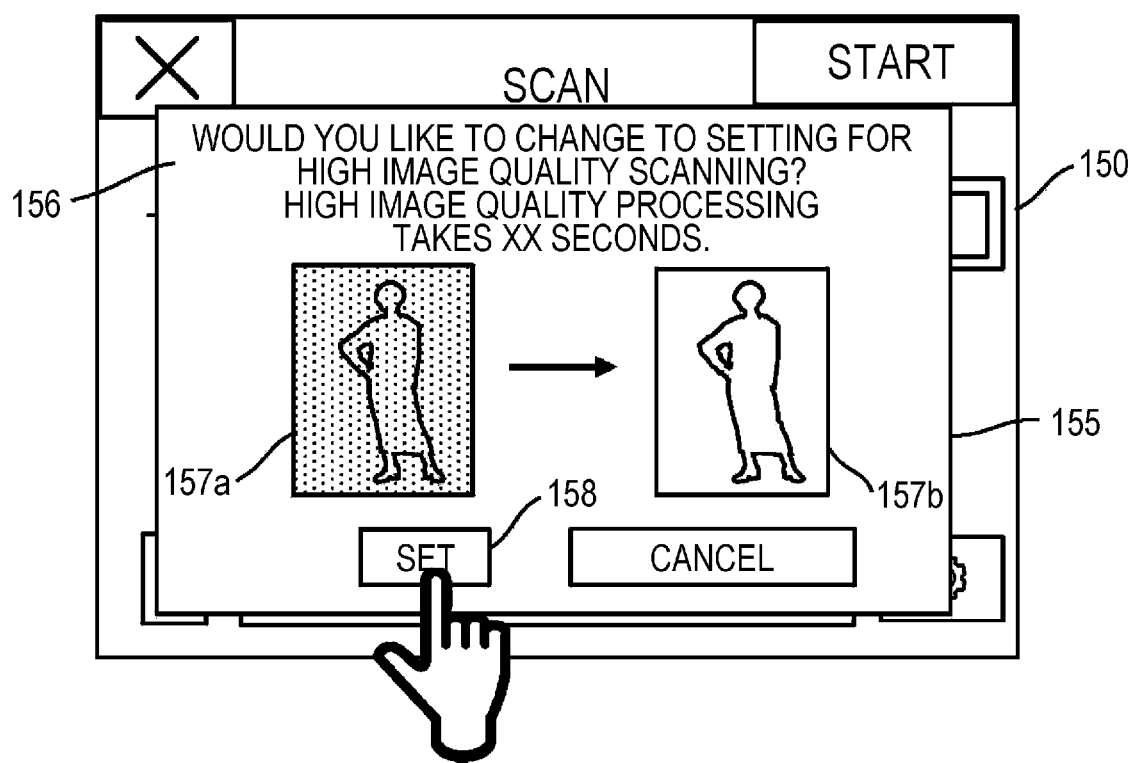

FIG. 7
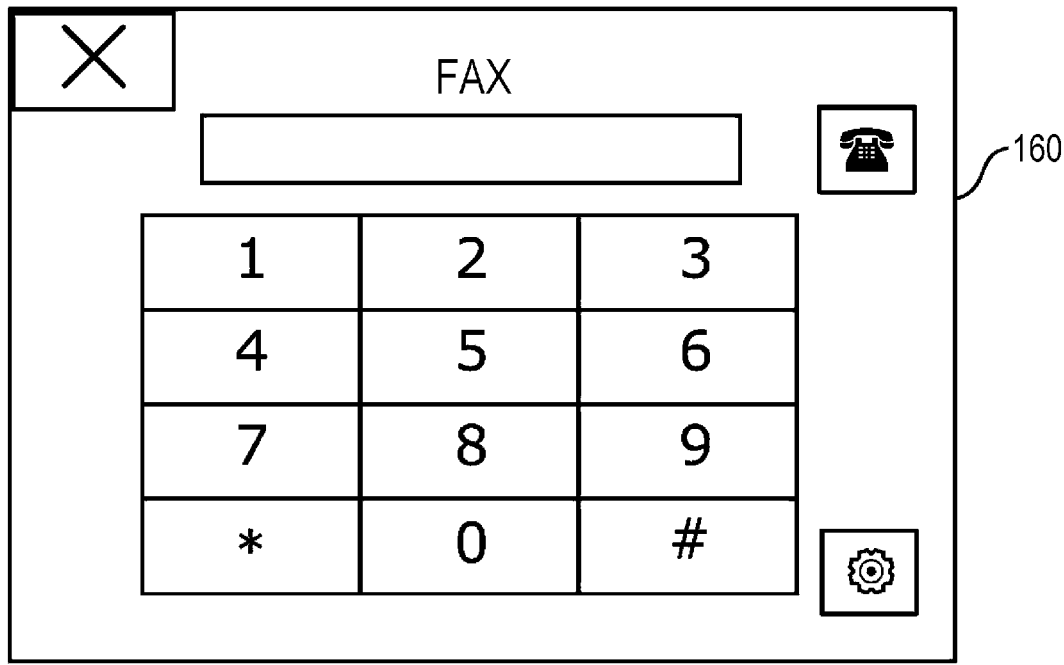
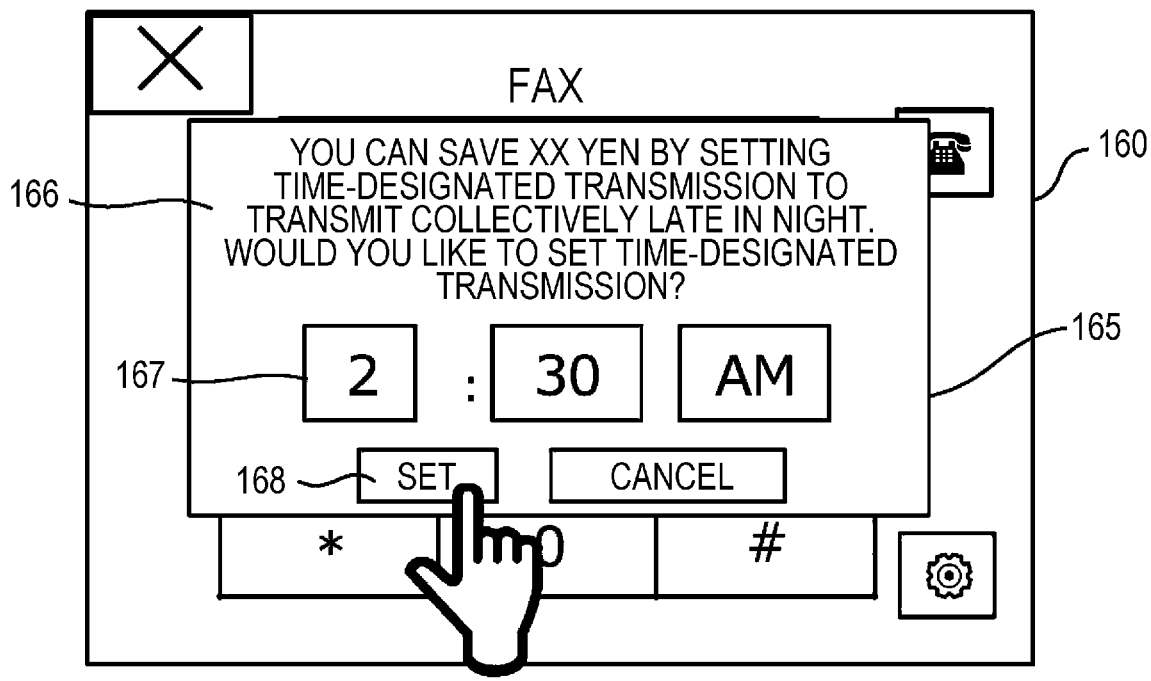

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-021861 filed Feb. 12, 2020.

BACKGROUND

(i) Technical Field

The present disclosure relates to an information processing apparatus and a non-transitory computer readable medium.

(ii) Related Art

There is known a technique of providing information that matches the state of a user. For example, International Publication No. 2017/94177 describes determining with reference to biological information on a user whether or not a condition that a specific biological state is continued is met, and distributing a content associated with the condition in the case where it is determined that the condition is met. Japanese Unexamined Patent Application Publication No. 2017-229035 describes determining the state of a user on the basis of biological information on the user when executing a transmission job, and executing a confirmation request process for requesting a confirmation about the transmission job from the user in the case where the user is in a non-normal state.

SUMMARY

The user occasionally performs an operation to make setting for a process when executing the process. Since settings for processes have been diversified in recent years, the user may not know setting for a process that may be convenient to the user. If the user is informed of such setting, the user is able to use the setting. However, it may be annoying if such setting is always suggested irrespective of the psychological state of the user. For example, it may be annoying if setting is suggested when the user is in a hurry.

Aspects of non-limiting embodiments of the present disclosure relate to improving the convenience to a user compared to the case where setting is suggested irrespective of the psychological state of the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor, in which the processor is configured to acquire biological information on a user while an operation related to a process is performed, and output information that suggests setting for the process in a case where the biological information indicates a peaceful psychological state.

BRIEF DESCRIPTION OF THE DRAWINGS

An exemplary embodiment of the present disclosure will be described in detail based on the following figures, wherein:

FIG. 6 illustrates an example of a screen transition for a case where the target process is a scan process;

FIG. 7 illustrates an example of a screen transition for a case where the target process is a facsimile process;

DETAILED DESCRIPTION

1. Configuration

Figure 1:
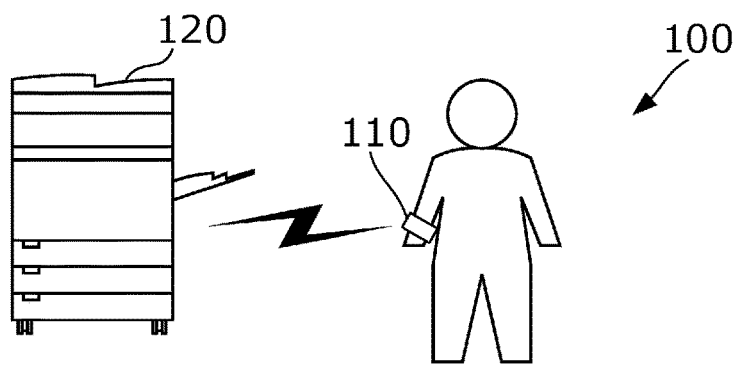
FIG. 1 illustrates an example of the configuration of an image processing system according to an exemplary embodiment.

FIG. 1 illustrates an example of the configuration of an image processing system 100 according to the present exemplary embodiment. The image processing system 100 suggests setting for a process to a user in the case where the user is in a peaceful psychological state. The "peaceful psychological state" refers to a state in which the user is mentally peaceful. Examples of the peaceful psychological state may include a temporally unoccupied state, an unhurried state, a state with no urgent business, a steady state, an unconcerned state, and a relaxed state. The peaceful psychological state may be any psychological state that permits suggestion of setting for a process. The image processing system 100 includes a wearable terminal 110 and an image processing apparatus 120. The image processing apparatus 120 is an example of the information processing apparatus according to the present disclosure.

The wearable terminal 110 is mounted to the user, and measures biological information on the user. The biological information indicates whether or not the user is in a peaceful psychological state. The wearable terminal 110 has the shape of a wristband mounted to an arm, for example, as illustrated in FIG. 1. However, the shape of the wearable terminal 110 is not limited to a wristband shape. For example, the shape of the wearable terminal 110 may be any shape such as the shape of a ring mounted to a finger, the shape of a clip attached to a garment, the shape of glasses mounted to the head, and a head-mount type. The wearable terminal 110 includes one or a plurality of sensors (not illustrated) that measure biological information. The biological information includes a heart rate or a blood pressure, for example. In the case where the biological information includes a heart rate, for example, the wearable terminal 110 includes a heart rate meter that measures the heart rate. In the case where the biological information includes a blood pressure, the wearable terminal 110 includes a sphygmomanometer that measures the blood pressure. The wearable terminal 110 also includes a communication section (not illustrated). The communication section performs data communication with a different device in accordance with Bluetooth (registered trademark), for example. However, the communication standard which is employed by the communication section is not limited to Bluetooth (registered trademark), and may be a different communication standard. The wearable terminal 110 transmits the biological information from the communication section to the image processing apparatus 120, for example.

Figure 2:
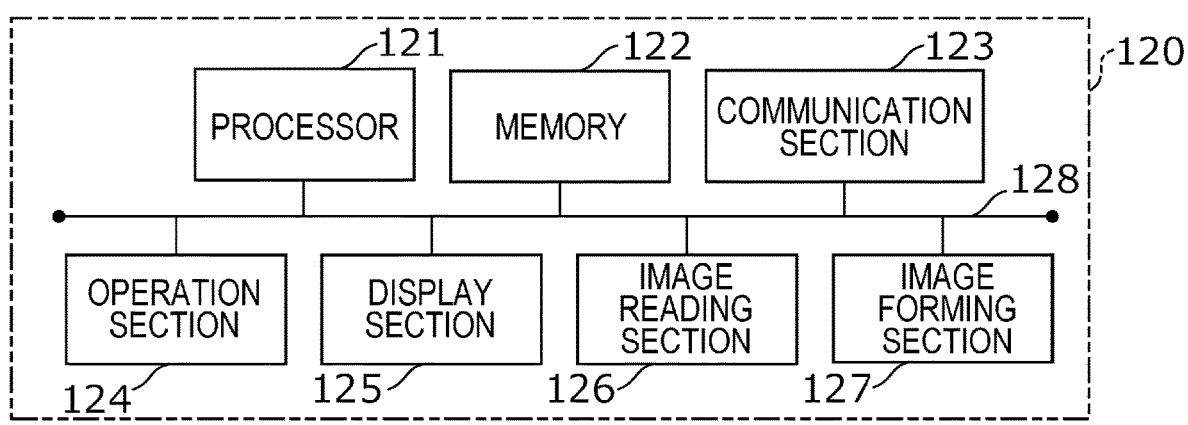
FIG. 2 illustrates an example of the configuration of an image processing apparatus.

FIG. 2 illustrates an example of the configuration of the image processing apparatus 120. The image processing apparatus 120 has a plurality of functions to process an image, such as a copy function, a print function, a scan function, and a facsimile function. The image processing apparatus 120 performs a process that implements such functions. The process includes a process of generating an image. Each process includes a plurality of settings. The image processing apparatus 120 includes a processor 121, a memory 122, a communication section 123, an operation section 124, a display section 125, an image reading section 126, and an image forming section 127. Such sections are connected to each other via a bus 128.

The processor 121 controls the various sections of the image processing apparatus 120 or performs various processes by executing a program. The processor 121 is a central processing unit (CPU), for example. The memory 122 stores a program to be executed by the processor 121. The memory 122 is a read only memory (ROM) and a random access memory (RAM), for example. The memory 122 may also be a hard disk drive or a solid state drive (SSD), for example, in addition to the ROM and the RAM. The memory 122 stores a plurality of application programs (hereinafter referred to as "apps") that achieve the plurality of functions of the image processing apparatus 120. Examples of the plurality of apps include a copy app that achieves the copy function, a scan app that achieves the scan function, and a facsimile app that achieves the facsimile function. The communication section 123 performs data communication with a different device connected via a communication line. The communication line may be a wired communication line, or may be a wireless communication line. Examples of the communication standard which is employed by the communication section 123 include Bluetooth (registered trademark). The operation section 124 is used by the user to operate the image processing apparatus 120. Examples of the operation section 124 include a touch screen and buttons. The display section 125 displays various types of information. The display section 125 is a liquid crystal display, for example. The image reading section 126 reads an image, and converts the image into image data. The image reading section 126 is an image scanner, for example. The image forming section 127 forms an image that matches image data on a medium such as paper. The image forming section 127 is a printer, for example.

2. Operation

In the case where the processor 121 is indicated as the subject of a process in the following description, it is meant that the process is performed by the processor 121 performing computation or controlling operation of other hardware elements through cooperation of the program which is stored in the memory 122 and the processor 121 which executes the program.

Figure 3:
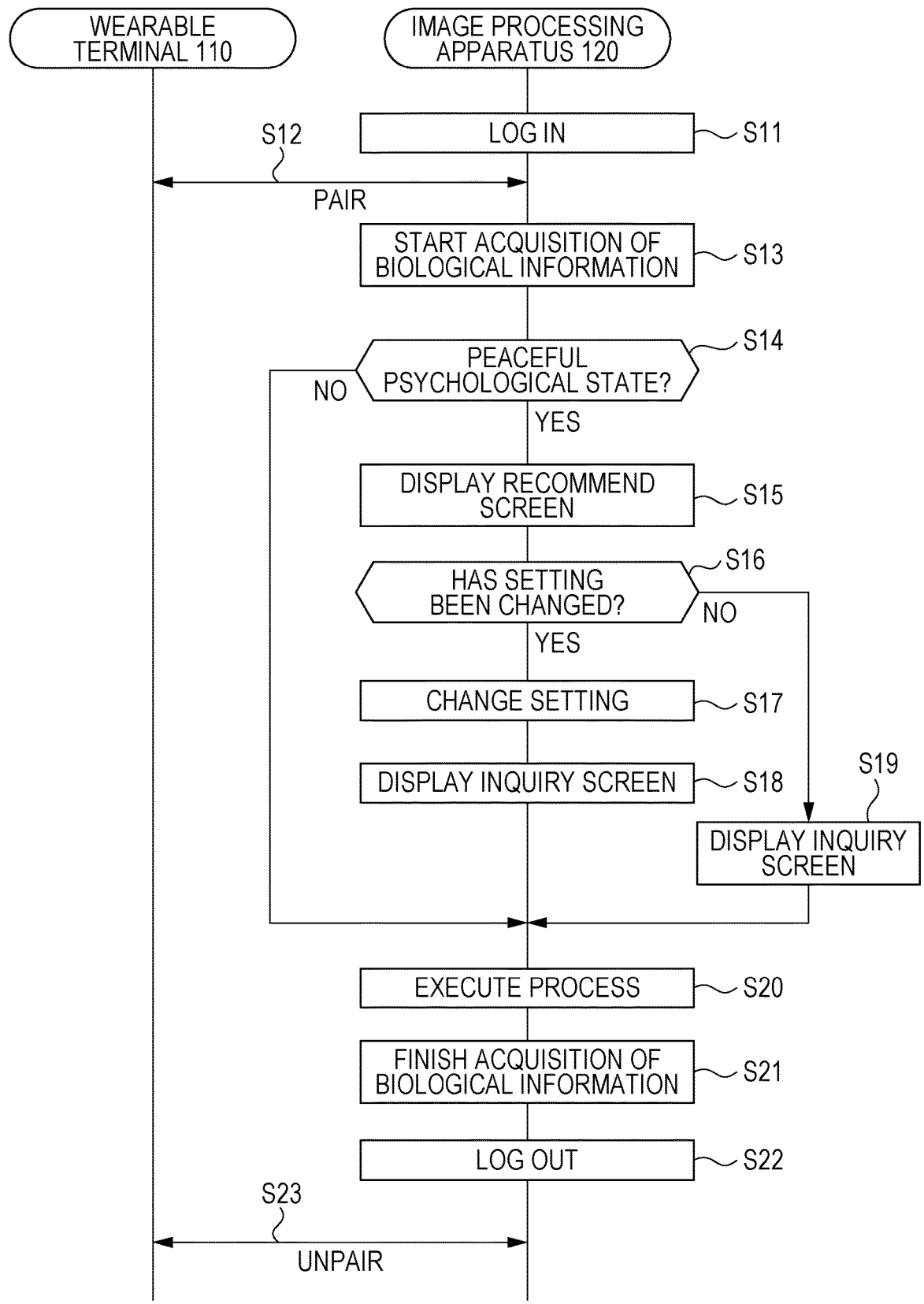
FIG. 3 is a sequence chart illustrating an example of operation performed by the image processing system.

FIG. 3 is a sequence chart illustrating an example of operation performed by the image processing system 100. This operation is performed when the user utilizes the image processing apparatus 120. In step S11, the user logs in to the image processing apparatus 120. The processor 121 of the image processing apparatus 120 authenticates the user who has logged in. The user performs an operation to input his/her user ID and password using the operation section 124. The processor 121 authenticates the user using the user ID and the password which are input by the user. When the user is successfully authenticated, the process proceeds to step S12. In the case where the user is not successfully authenticated, the process is ended.

In step S12, the processor 121 pairs the image processing apparatus 120 with the wearable terminal 110 of the user. At this time, first, the wearable terminal 110 of the user is specified. For example, the user ID of the user is correlated with a terminal ID of the wearable terminal 110 of the user in advance. A terminal ID correlated with the user ID which is input in step S11 is specified, and the wearable terminal 110 corresponding to the specified terminal ID is specified as the wearable terminal 110 of the user. Subsequently, the image processing apparatus 120 is paired with the specified wearable terminal 110 in accordance with Bluetooth (registered trademark). Consequently, the image processing apparatus 120 and the wearable terminal 110 of the user are wirelessly connected to each other. While the image processing apparatus 120 is paired with one wearable terminal 110, the image processing apparatus 120 is not paired with a different wearable terminal 110.

Figure 4:
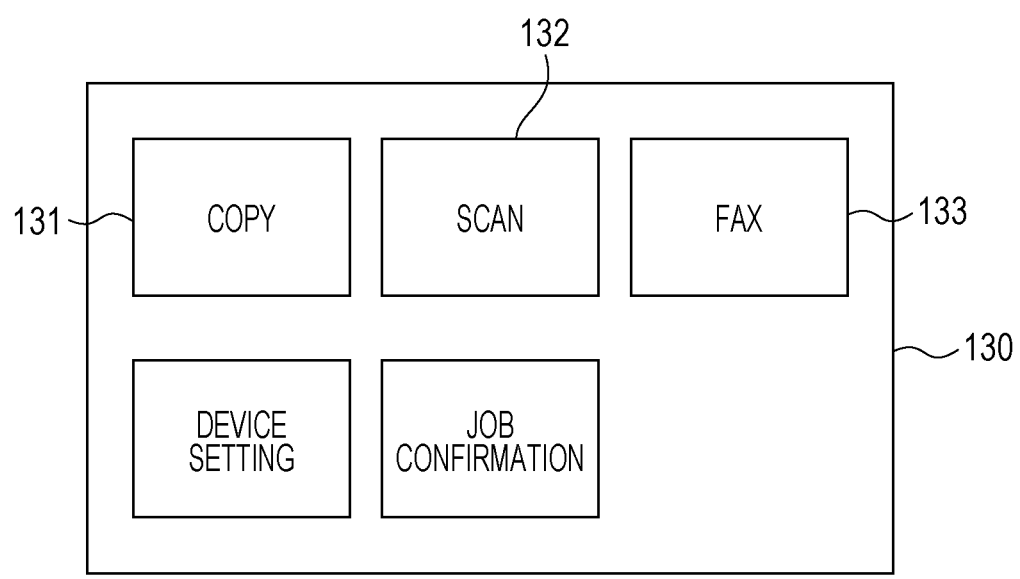
FIG. 4 illustrates an example of a menu screen.

In step S11 discussed above, when the user logs in to the image processing apparatus 120, a menu screen 130 is displayed on the display section 125. FIG. 4 illustrates an example of the menu screen 130. The menu screen 130 is used by the user to perform an operation to select a desired function from the plurality of functions of the image processing apparatus 120. The menu screen 130 includes select buttons 131 to 133 that are used for an operation to select the copy function, the scan function, and the facsimile function, respectively, of the image processing apparatus 120. When the user performs an operation to press one of the select buttons 131 to 133, a function corresponding to the select button is selected, and an app corresponding to the selected function is started. To use the copy function, for example, the user performs an operation to press the select button 131 corresponding to the copy function. The copy function is selected and the copy app is started in response to this operation. In the following description, the process of achieving the selected function is referred to as a "target process".

In step S13, when an app is started, the processor 121 starts acquisition of biological information from the wearable terminal 110. For example, the processor 121 transmits, from the communication section 123, a request to acquire biological information to the wearable terminal 110 which is paired in step S12. The wearable terminal 110 transmits biological information measured from the user to the image processing apparatus 120 in response to this acquisition request. The wearable terminal 110 receives, at the communication section 123, the biological information which is transmitted from the wearable terminal 110. Acquisition of biological information is started when an app is started, and repeatedly performed at time intervals determined in advance while the user is performing an operation related to the target process. That is, biological information on the user is acquired while the user is performing an operation related to the target process. Examples of the operation related to the process include an operation to select the process and an operation to make setting for the process.

In step S14, the processor 121 determines whether or not the user is in a peaceful psychological state by analyzing the biological information which is acquired from the wearable terminal 110. This determination is made in accordance with whether or not the biological information indicates that the user is in a peaceful psychological state. In the case where the biological information includes a heart rate or a blood pressure and when the heart rate or the blood pressure is equal to or less than a threshold value continuously for a determined period, for example, it is determined that the user is in a peaceful psychological state. The threshold value is set in advance to a maximum heart rate or blood pressure measured when a person is in a peaceful psychological state, for example. In the case where it is determined that the user is in a peaceful psychological state, the determination in step S14 is YES, and the process proceeds to step S15.

In step S15, the processor 121 displays, on the display section 125, a recommend screen that indicates information that suggests setting for the target process. The recommend screen suggests different setting in accordance with the target process. That is, different setting is suggested in accordance with the screen that is displayed on the display section 125. For example, setting for the copy process is suggested in the case where the target process is the copy process. Setting for the scan process is suggested in the case where the target process is the scan process. Setting for the facsimile process is suggested in the case where the target process is the facsimile process. The recommend screen suggests setting that is convenient to the user, for example.

Figure 5:
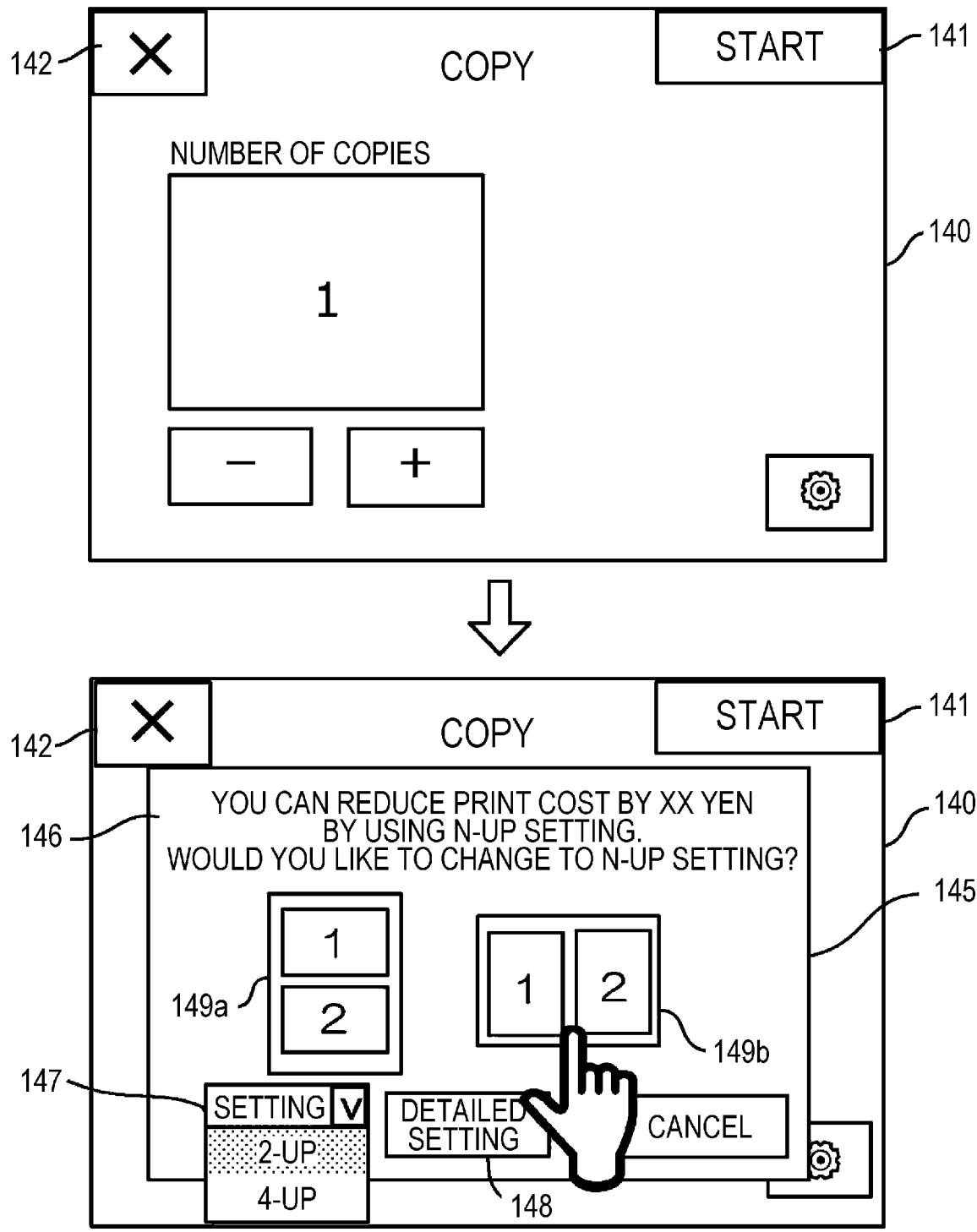
FIG. 5 illustrates an example of a screen transition for a case where the target process is a copy process.

FIG. 5 illustrates an example of a screen transition for a case where the target process is the copy process. When the select button 131 corresponding to the copy function is pressed on the menu screen 130 illustrated in FIG. 4, the copy app is started, and a copy screen 140 illustrated in FIG. 5 is displayed on the display section 125. If it is determined in step S14 that the user is in a peaceful psychological state, a recommend screen 145 is displayed on the copy screen 140 as illustrated in FIG. 5. The recommend screen 145 may be a dialog box, for example.

In the case where the target process is the copy process, setting that reduces the cost required for the copy process is suggested. Here, "N-up" which is one of settings for the copy process is suggested. N-up refers to setting to allow images of a plurality of pages to be copied collectively to one sheet. N-up includes 2-up which allows images of two pages to be copied collectively to one sheet, and 4-up which allows images of four pages to be copied collectively to one sheet. Use of N-up setting reduces the number of copies to be made, and therefore conveniently reduces the cost required for the copy process. However, N-up copy changes the layout, and therefore requires an advance confirmation of the output result, for example, which may take time.

The recommend screen 145 includes a message 146 that suggests N-up. The message 146 includes effect information that indicates the effect to be obtained through N-up. In the example illustrated in FIG. 5, the message 146 includes a cost "xx yen" to be reduced through N-up as the effect information. The cost to be reduced is obtained by subtracting, from a first cost required for the copy process when N-up setting is not made, a second cost required for the copy process when N-up setting is made, for example. The first cost is calculated using the number of copies to be made in the case where N-up setting is not made and the cost per sheet required for the copy process, for example. The second cost is calculated using the number of copies to be made in the case where N-up setting is made and the cost per sheet required for the copy process, for example.

The recommend screen 145 also includes an operation image that is used for an operation to select one of 2-up and 4-up. The recommend screen 145 further includes a detailed setting button 148. When the detailed setting button 148 is pressed, a detailed setting screen is displayed. The user is able to make detailed setting about N-up using the detailed setting screen. The recommend screen 145 further includes operation images 149a and 149b that are used for an operation to make setting for N-up. The operation images 149a and 149b also serve as layout views for N-up. The operation image 149a illustrates a vertical layout. The operation image 149b illustrates a horizontal layout. In the case where 2-up is selected, the operation images 149a and 149b illustrate layout views for 2-up. In the case where 4-up is selected, on the other hand, the operation images 149a and 149b illustrate layout views for 4-up. Since layout views for a case where N-up setting is made are presented to the user using the operation images 149a and 149b, the user is able to see how the layout is changed after N-up setting is made. In the case where setting for 2-up in the horizontal layout is to be made, for example, the user performs an operation to select 2-up using the operation image 147, and thereafter performs an operation to press the operation image 149b. Consequently, setting for 2-up in the horizontal layout is made.

FIG. 6 illustrates an example of a screen transition for a case where the target process is the scan process. When the select button 132 corresponding to the scan function is pressed on the menu screen 130 illustrated in FIG. 4, the scan app is started, and a scan screen 150 illustrated in FIG. 6 is displayed on the display section 125. If it is determined in step S14 that the user is in a peaceful psychological state, a recommend screen 155 is displayed on the scan screen 150 as illustrated in FIG. 6. The recommend screen 155 may be a dialog box, for example.

In the case where the target process is the scan process, setting to improve the quality of the output result of the scan process is suggested. Here, "high image quality setting" which is one of settings for the scan process is suggested. "High image quality setting" refers to setting to scan for a higher image quality than normal. Use of high image quality setting conveniently improves the image quality of an image obtained through scanning. Use of such setting is particularly convenient in scanning an image for which a high image quality is required such as a photograph. In the case where a scan process is performed in accordance with the high image quality setting, however, the scan process may take time, since the scan process is performed with an increased resolution or high-precision image processing is performed by an external server device (not illustrated) connected to the image processing apparatus 120 via a communication line. The recommend screen 155 includes a message 156 that suggests the high image quality setting. The message 156 includes a time "xx seconds" required for the scan process when the scan process is performed in accordance with the high image quality setting. The time is calculated using the number of sheets to be scanned and the time per sheet required for the scan process when the high image quality setting is made, for example.

The recommend screen 155 also includes effect information that indicates the effect to be obtained through the high image quality setting. In the example illustrated in FIG. 6, the recommend screen 155 includes a thumbnail 157a that indicates an image to be obtained through the scan process when the high image quality setting is not made, and a thumbnail 157b that indicates an image to be obtained through the scan process when the high image quality setting is made. The image indicated by the thumbnail 157a and the image indicated by the thumbnail 157b are an example of the first image and an example of the second image, respectively, according to the present disclosure. The thumbnails 157a and 157b allow the user to confirm, in advance, variations in the image quality for a case where the high image quality setting is made. The recommend screen 155 further includes a set button 158 that is used for an operation to make the high image quality setting. The set button 158 is an example of the operation image according to the present disclosure. To make the high image quality setting, for example, the user performs an operation to press the set button 158. Consequently, the high image quality setting is made.

FIG. 7 illustrates an example of a screen transition for a case where the target process is the facsimile process. When the select button 133 corresponding to the facsimile function is pressed on the menu screen 130 illustrated in FIG. 4, the facsimile app is started, and a facsimile screen 160 illustrated in FIG. 7 is displayed on the display section 125. If it is determined in step S14 that the user is in a peaceful psychological state, a recommend screen 165 is displayed on the facsimile screen 160 as illustrated in FIG. 7. The recommend screen 165 may be a dialog box, for example.

In the case where the target process is the facsimile process, setting that reduces the communication cost required for the facsimile process is suggested. Here, "time-designated transmission" which is one of settings for the facsimile process is suggested. The time-designated transmission refers to setting to transmit facsimiles collectively at a designated time. In general, the communication cost is lower late in the night than in the daytime. Thus, if setting for time-designated transmission is made by designating a time late in the night, for example, facsimiles are transmitted collectively late in the night, and therefore the communication cost required for the facsimile process is conveniently reduced. However, facsimiles are not transmitted before the designated time, and therefore it takes time before the facsimiles are transmitted.

The recommend screen 165 includes a message 166 that suggests time-designated transmission. The message 166 includes effect information that indicates the effect to be obtained through the time-designated transmission. In the example illustrated in FIG. 7, the message 166 includes a cost "xx yen" to be reduced through the time-designated transmission as the effect information. The cost to be reduced is obtained by subtracting, from a first communication cost required for the facsimile process when setting for the time-designated transmission is not made, a second communication cost required for the facsimile process when setting for the time-designated transmission is made, for example. The first communication cost is calculated using the number of sheets to be faxed and the communication cost per sheet required in the case where the sheets are faxed at the present time, for example. The second communication cost is calculated using the number of sheets to be faxed and the communication cost per sheet required in the case where the sheets are faxed at the designated time, for example.

The recommend screen 165 also includes a text box 167 that is used for an operation to designate a time, and a set button 168 that is used for an operation to make setting for time-designated transmission. The text box 167 and the set button 168 are examples of the operation image according to the present disclosure. In the case where facsimiles are to be transmitted collectively at 2:30 a.m., for example, the user performs an operation to input the time "2:30 a.m." to the text box 167, and thereafter performs an operation to press the set button 168. Consequently, setting for time-designated transmission designating the time "2:30 a.m." is made.

In step S16, the processor 121 determines whether or not setting has been changed to the setting suggested on the recommend screen displayed in step S15. For example, it is determined that setting has been changed to the setting suggested on the recommend screen in the case where setting for N-up is made on the recommend screen 145 illustrated in FIG. 5. Likewise, it is determined that setting has been changed to the setting suggested on the recommend screen also in the case where high image quality setting is made on the recommend screen 155 illustrated in FIG. 6 or in the case where setting for time-designated transmission is made on the recommend screen 165 illustrated in FIG. 7. In this case, the determination in step S16 is YES, and the process proceeds to step S17.

In step S17, the processor 121 changes setting in accordance with an operation performed on the recommend screen. For example, in the case where setting for N-up is made on the recommend screen 145 illustrated in FIG. 5, setting for the copy process is changed such that N-up copy is performed. In the case where high image quality setting is made on the recommend screen 155 illustrated in FIG. 6, setting for the scan process is changed such that an image is scanned with a high image quality. In the case where setting for time-designated transmission is made on the recommend screen 165 illustrated in FIG. 7, setting for the facsimile process is changed such that facsimiles are transmitted at a designated time.

Figure 8:
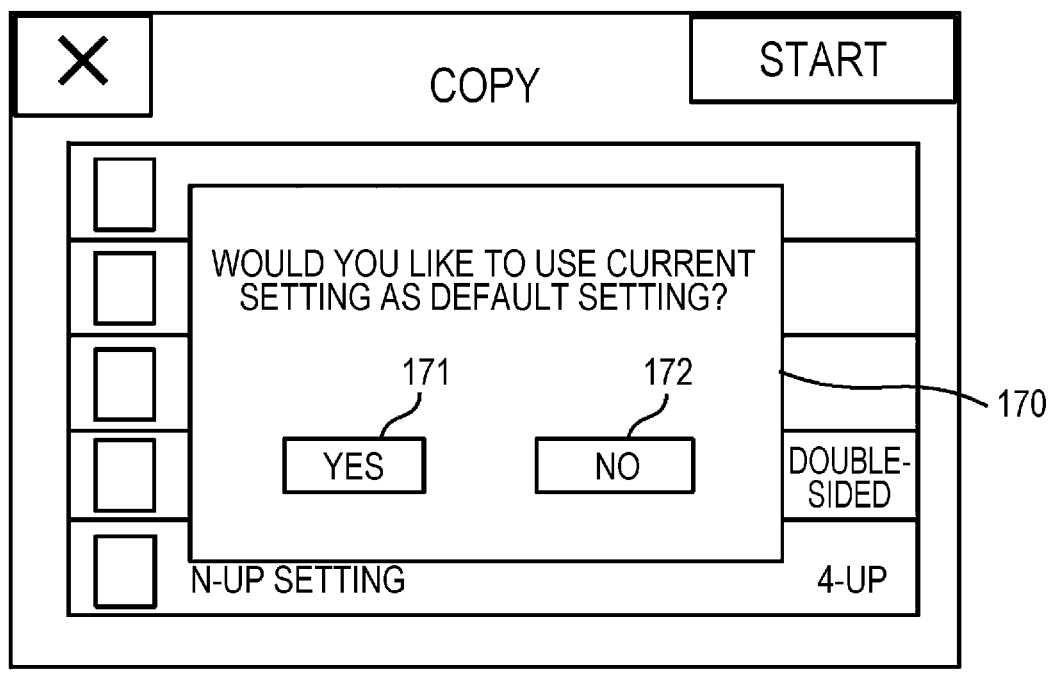
FIG. 8 illustrates an example of an inquiry screen.

In step S18, the processor 121 displays, on the display section 125, an inquiry screen 170 that inquires whether to use the setting changed in step S17 as default setting from now on. FIG. 8 illustrates an example of the inquiry screen 170. The inquiry screen 170 may be displayed on one of the copy screen 140, the scan screen 150, and the facsimile screen 160 illustrated in FIGS. 5 to 7, respectively, or may be displayed on a confirmation screen that is used to confirm setting for a process in the case where the confirmation screen is displayed. The inquiry screen 170 may be a dialog box, for example.

The inquiry screen 170 includes a message that inquires whether to use the setting after the change as default setting. The inquiry screen 170 also includes a "YES" button 171 and a "NO" button 172. The "YES" button 171 is used for an operation to permit using the setting after the change as default setting. The "NO" button 172 is used for an operation to refuse to use the setting after the change as default setting. In the case where the user desires to use the setting after the change as default setting, for example, he/she performs an operation to press the "YES" button 171. When the "YES" button 171 is pressed, the setting after the change is stored in the memory 122 in association with the user ID of the user. Then, the setting after the change is used as default setting in the case where the user uses the image processing apparatus 120 the next time or later.

Figure 9:
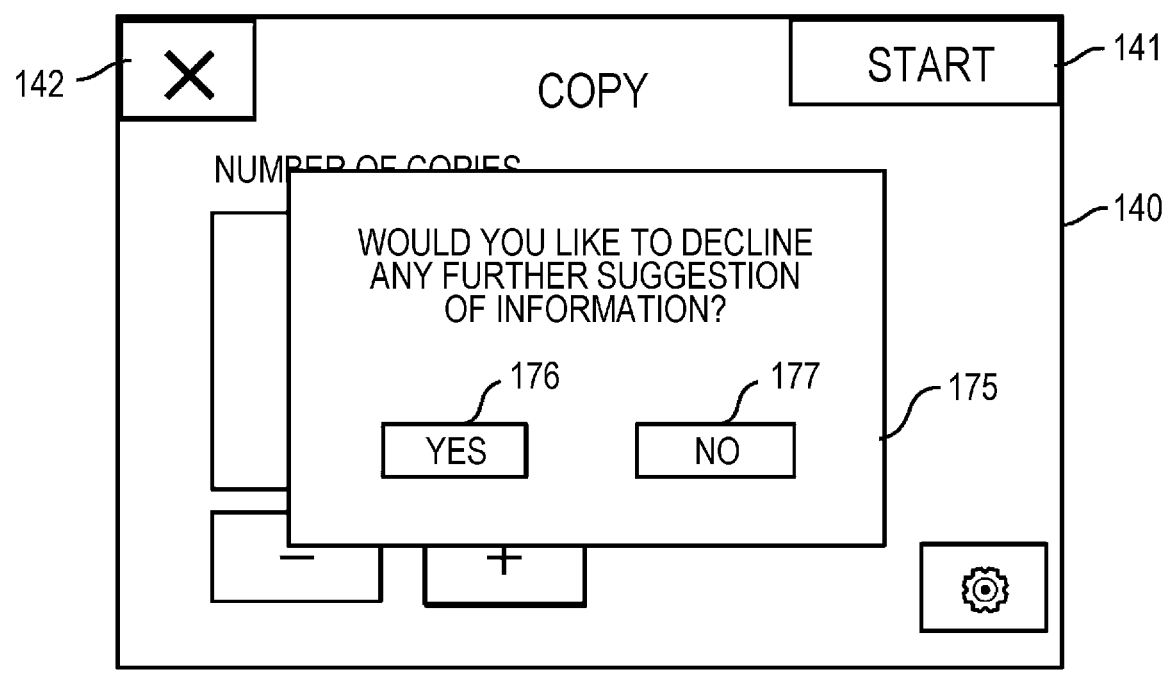
FIG. 9 illustrates an example of the inquiry screen.

In the case where it is determined in step S16 discussed above that setting has not been changed to the setting suggested on the recommend screen displayed in step S15, on the other hand, the determination in step S16 is NO, and the process proceeds to step S19. In step S19, the processor 121 displays, on the display section 125, an inquiry screen 175 that inquires whether or not to prohibit display of the recommend screen from now on. This allows the user to select whether or not the recommend screen is to be displayed, since some users do not desire suggestion of setting for a process. FIG. 9 illustrates an example of the inquiry screen 175. The inquiry screen 175 is displayed on one of the copy screen 140, the scan screen 150, and the facsimile screen 160 illustrated in FIGS. 5 to 7, respectively. The inquiry screen 175 may be a dialog box, for example.

The inquiry screen 175 includes a message that inquires whether to prohibit display of the recommend screen from now on. The inquiry screen 175 also includes a "YES" button 176 and a "NO" button 177. The "YES" button 176 is used for an operation to prohibit display of the recommend screen from now on. The "NO" button 177 is used for an operation to permit display of the recommend screen also from now on. In the case where the user desires to prohibit display of the recommend screen from now on, for example, he/she performs an operation to press the "YES" button 176. If the "YES" button 176 is pressed, the recommend screen is not displayed even if the determination in step S14 is YES the next time or later.

In step S20, the processor 121 executes the process in accordance with the setting when an instruction to start the process is provided. As illustrated in FIG. 5, for example, the recommend screen 145 includes a start button 141 that is used for an operation to provide an instruction to start the copy process. When an operation to press the start button 141 is performed after setting for 2-up is made on the recommend screen 145 illustrated in FIG. 5, for example, the image reading section 126 and the image forming section 127 copy images of two pages collectively to one sheet.

In the case where it is determined in step S14 discussed above that the user is not in a peaceful psychological state, the determination in step S14 is NO, and the process proceeds to step S20 by skipping the processes in S15 to S18. In this case, setting for a process is not suggested, and therefore the user makes setting for himself/herself. In step S20, the process is executed in accordance with the setting. Likewise, also in the case where it is determined in step S16 discussed above that setting has not been changed to the suggested setting, setting for a process is not suggested, and therefore the process is executed in accordance with the setting that the use made for himself/herself.

In step S21, the processor 121 finishes acquisition of biological information when the app is finished. In the example illustrated in FIG. 5, the copy screen 140 includes a close button 142. When the copy process is completed, the user performs an operation to press the close button 142. When an operation to press the close button 142 is performed, the copy app is finished, and the display section 125 returns to the menu screen 130 illustrated in FIG. 4. Acquisition of biological information is finished when the copy app is finished. When the user logs out from the image processing apparatus 120 in step S22, the processor 121 unpairs the image processing apparatus 120 from the wearable terminal 110 in step S23.

3. Modifications

The exemplary embodiment discussed above is an example of the present disclosure. The present disclosure is not limited to the exemplary embodiment discussed above. The exemplary embodiment discussed above may be modified as in the following examples to be implemented. Two or more of the following modifications may be combined with each other.

In the exemplary embodiment discussed above, the recommend screen may suggest setting, the frequency of use of which by the user is low, for the target process. In this case, the processor 121 stores, in the memory 122, a history of settings for processes made in accordance with operations by the user. The processor 121 selects setting, the frequency of use of which by the user is equal to or less than a threshold value, from among a plurality of settings for the target process from the setting history acquired from the memory 122. Then, the selected setting is suggested on the recommend screen. Since setting that is not included in the history of settings has not been used by the user, for example, such setting may be selected and suggested on the recommend screen. With this modification, the user may be informed of setting that he/she does not use frequently. In a different example, the trend of use by the user is analyzed using a history of settings, and setting that has not been used by the user but that deviates from the trend of use by the user may be excluded from candidates to be suggested to the user, since such setting is considered not to be used by the user also from now on.

In the exemplary embodiment discussed above, the recommend screen may suggest setting, the frequency of use of which by the user is low and the frequency of use of which by other users is high. In this case, the processor 121 stores, in the memory 122, a first setting history which is a history of settings for processes performed in accordance with operations by the user and a second setting history which is a history of settings for processes performed in accordance with operations by other users. The processor 121 selects setting, the frequency of use of which by the user is equal to or less than a first threshold value and the frequency of use of which by other users is equal to or more than a second threshold value, from among a plurality of settings for the target process using the first setting history and the second setting history acquired from the memory 122. Then, the selected setting is suggested on the recommend screen. Since setting that is not included in the first setting history but that is included in the second setting history the most has not been used by the user but is often used by other users, such setting may be suggested on the recommend screen. With this modification, the user may be informed of setting that other users often use.

In the exemplary embodiment discussed above, the recommend screen may suggest setting other than settings that have already been made for the target process in accordance with operations by the user. That is, it is not necessary to suggest settings that have already been made for the target process in accordance with operations by the user. For example, in the case where the user has made setting for 2-up for the copy process, setting for N-up including 2-up is not suggested. In the case where the user has made setting for color copy for the copy process, setting for color copy is not suggested. In this case, setting for monochrome copy, which is relevant to color copy, is also not suggested. With this modification, setting that has already been made for the process by the user is not suggested to the user.

In the exemplary embodiment discussed above, the recommend screen may suggest setting newly added for the target process. For example, a program for implementing new setting is occasionally downloaded to the image processing apparatus 120. In this case, setting implemented by the newly downloaded program may be suggested. With this modification, newly added setting may be suggested to the user.

In the exemplary embodiment discussed above, the recommend screen may preferentially suggest setting achieved in cooperation with a different device. For example, certain setting is occasionally achieved in cooperation with the wearable terminal 110 or a user terminal used by the user. In this case, this setting may be suggested. When used in cooperation with a different device, initial setting is occasionally required for the cooperation. To be paired with a different device for the first time, for example, initial setting for pairing is occasionally required. In this case, the recommend screen may include an operation image that is used for an operation to make initial setting. The user makes initial setting using the operation image.

In the exemplary embodiment discussed above, setting suggested on the recommend screen is not limited to setting that reduces a cost or setting that improves the quality of the output result. For example, in the case where the target process is a process that involves communication, setting that improves information security may be suggested. In addition, setting to be suggested in the case where the target process is the copy process, the scan process, or the facsimile process is not limited to the examples in the exemplary embodiment discussed above. For example, setting to be suggested in the case where the target process is the copy process may be setting for double-sided copy or monochrome copy. That is, setting to be suggested on the recommend screen may be any setting related to the target process. In addition, the number of settings to be suggested on the recommend screen is not limited to one, and may be two or more.

While the setting after the change is used as default setting in order to facilitate making the setting after the change the next time in the exemplary embodiment discussed above, the method to facilitate making the setting after the change is not limited to this example. For example, a shortcut to the setting after the change may be prepared and displayed on the menu screen 130. In this case, the user may make the setting after the change easily using the shortcut the next time he/she uses the image processing apparatus 120.

In the exemplary embodiment discussed above, biological information may not necessarily be acquired a plurality of times. For example, it may be determined whether or not the user is in a peaceful psychological state on the basis of the biological information which is acquired when an app is started. The recommend screen may be hidden in the case where the biological information which is acquired after the recommend screen is displayed indicates a change to an unpeaceful psychological state.

In the exemplary embodiment discussed above, the administrator of the image processing apparatus 120 may determine to or not to acquire biological information. In the case where biological information is not acquired, the recommend screen is not displayed. In the exemplary embodiment discussed above, in addition, biological information may not be acquired and the recommend screen may not be displayed in the case where an app other than a specific app is started. For example, biological information may not be acquired and the recommend screen may not be displayed in the case where an app for making setting for communication is started.

In the exemplary embodiment discussed above, information that suggests setting for the target process may not necessarily be displayed on the display section 125. It is only necessary that information that suggests setting for the target process should be output. For example, information included in the recommend screen may be transmitted to the wearable terminal 110 or a different terminal that is used by the user.

In the exemplary embodiment discussed above, acquisition of biological information may not necessarily be started when an app is started. For example, acquisition of biological information may be started when the user logs in to the image processing apparatus 120.

In the exemplary embodiment discussed above, in the case where the user is not authenticated by the image processing apparatus 120, the processor 121 may detect the wearable terminal 110 that is the closest to the image processing apparatus 120 at the timing when the user uses the image processing apparatus 120, and pair the image processing apparatus 120 with the detected wearable terminal 110. This timing may be the time when the image processing apparatus 120 returns from a power-saving mode in the case where the image processing apparatus 120 has a power-saving mode, or may be the time when the image processing apparatus 120 is started, for example. In this case, in addition, the processor 121 may unpair the image processing apparatus 120 from the wearable terminal 110 at the timing when the user does not use the image processing apparatus 120 any more. This timing may be the time when the image processing apparatus 120 transitions to a power-saving mode in the case where the image processing apparatus 120 has a power-saving mode, for example.

In the exemplary embodiment discussed above, a different information processing apparatus may be used in place of the image processing apparatus 120. For example, the information processing apparatus may include any information processing apparatus such as a home electric appliance, an audio device, and a computer. The process performed by the information processing apparatus is not limited to a process in which an images is used. The process performed by the information processing apparatus may be any process performed in accordance with setting made in accordance with an operation by the user.

The subjects of the processes in the image processing system 100 according to the exemplary embodiment discussed above are exemplary, and are not limited to such examples. For example, at least some of the processes performed by the image processing apparatus 120 may be performed by a different device. In addition, the processes in the image processing system 100 according to the exemplary embodiment discussed above are exemplary, and may be reordered unless any contradiction occurs.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The present disclosure may be provided as a program to be executed by each of the image processing apparatus 120 and the wearable terminal 110. The image processing apparatus 120 and the wearable terminal 110 are each an example of the computer according to the present disclosure. The program may be downloaded via a communication line such as the Internet, and may be provided as recorded in a computer-readable recording medium such as a magnetic recording medium (such as a magnetic tape and a magnetic disk), an optical recording medium (such as an optical disc), a magneto-optical recording medium, and a semiconductor memory.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor,
wherein the processor is configured to
acquire biological information on a user while an operation related to a process is performed,
determine whether the user is in a peaceful psychological state based on the acquired biological information,
in response to determining that the user is in the peaceful psychological state, display a setting screen for the user to change a first setting for the process, and
in response to determining that the user is not in the peaceful psychological state, not display the setting screen for the user to change the first setting for the process.

2. The information processing apparatus according to claim 1,
wherein a plurality of settings are provided for the process, and
the first setting is a setting from among the plurality of settings that has a frequency of use by the user that is less than or equal to a first threshold from among the plurality of settings.

3. The information processing apparatus according to claim 2,
wherein the first setting has a frequency of use by other users that is greater than or equal to a second threshold.

4. The information processing apparatus according to claim 1,
wherein a plurality of settings are provided for the process, and
the first setting is different from settings that have already been made for the process in accordance with the operation by the user, and is from among the plurality of settings.

5. The information processing apparatus according to claim 1,
wherein a plurality of settings are provided for the process, and
the first setting is newly added for the process, and is from among the plurality of settings.

6. The information processing apparatus according to claim 1,
wherein the processor displays the setting screen on a display section, and
the setting screen includes an operation image that is used for the operation to make the first setting.

7. The information processing apparatus according to claim 2,
wherein the processor displays the setting screen on a display section, and
the setting screen includes an operation image that is used for the operation to make the first setting.

8. The information processing apparatus according to claim 3,
wherein the processor displays the setting screen on a display section, and
the setting screen includes an operation image that is used for the operation to make the first setting.

9. The information processing apparatus according to claim 4,
wherein the processor displays the setting screen on a display section, and
the setting screen includes an operation image that is used for the operation to make the first setting.

10. The information processing apparatus according to claim 5,
wherein the processor displays the setting screen on a display section, and
the setting screen includes an operation image that is used for the operation to make the first setting.

11. The information processing apparatus according to claim 1,
wherein the processor displays the setting screen on a display section, and
the setting screen includes effect information that indicates an effect to be obtained through the first setting.

12. The information processing apparatus according to claim 6,
wherein
the setting screen includes effect information that indicates an effect to be obtained through the first setting.

13. The information processing apparatus according to claim 7,
wherein
the setting screen includes effect information that indicates an effect to be obtained through the first setting.

14. The information processing apparatus according to claim 8,
wherein
the setting screen includes effect information that indicates an effect to be obtained through the first setting.

15. The information processing apparatus according to claim 9,
wherein
the setting screen includes effect information that indicates an effect to be obtained through the first setting.

16. The information processing apparatus according to claim 10,
wherein
the setting screen includes effect information that indicates an effect to be obtained through the first setting.

17. The information processing apparatus according to claim 11,
wherein the effect information indicates a cost to be reduced through the first setting.

18. The information processing apparatus according to claim 12,
wherein the effect information indicates a cost to be reduced through the first setting.

19. The information processing apparatus according to claim 11,
wherein the process is a process of generating an image, and
the effect information includes a first image generated through the process when the first setting is not made, and a second image generated through the process when the first setting is made.

20. A non-transitory computer readable medium storing a program causing a computer to execute a process comprising:
acquiring biological information on a user while an operation related to a process is performed,
determining whether the user is in a peaceful psychological state based on the acquired biological information,
in response to determining that the user is in the peaceful psychological state, displaying a setting screen for the user to change a setting for the process, and in response to determining that the user is not in the peaceful psychological state, not displaying the setting screen for the user to change the setting for the process.

* * * * *